United States Patent [19]

Gilbert

[11] Patent Number: 5,725,219
[45] Date of Patent: Mar. 10, 1998

[54] MECHANICAL FACE SEAL WITH ELASTOMERIC BELLOWS UNIT AND INTERMESHING DRIVE BANDS

[75] Inventor: James Gilbert, Little Chalfont, United Kingdom

[73] Assignee: John Crane UK Limited, Slough, United Kingdom

[21] Appl. No.: 822,740

[22] Filed: Mar. 25, 1997

[30] Foreign Application Priority Data

Mar. 30, 1996 [GB] United Kingdom ............... 9606815

[51] Int. Cl.⁶ ........................................... F16J 15/34
[52] U.S. Cl. ..................... 277/8; 277/88; 277/93 R; 277/89; 277/136
[58] Field of Search .................. 277/8, 42, 43, 277/86, 88, 89, 93 R, 93 SD, 81 R, 136

[56] References Cited

U.S. PATENT DOCUMENTS

| | | | |
|---|---|---|---|
| 2,375,985 | 5/1945 | Freeman | 277/81 R |
| 2,467,239 | 4/1949 | Snyder | 277/81 R |
| 2,728,591 | 12/1955 | Solari | 277/93 R |
| 2,995,391 | 8/1961 | Snyder | 277/89 |
| 3,043,598 | 7/1962 | Moxon | 277/93 |
| 3,117,793 | 1/1964 | Hauser et al. | 277/89 |
| 3,179,425 | 4/1965 | Andresen | 277/93 R |
| 4,127,275 | 11/1978 | Champlin | 277/8 |
| 4,451,049 | 5/1984 | Charhut | 277/89 |
| 4,521,025 | 6/1985 | Leonardsson | 277/89 |
| 5,332,235 | 7/1994 | Fone et al. | 277/93 R |

FOREIGN PATENT DOCUMENTS

| | | |
|---|---|---|
| 1350045 | 4/1974 | United Kingdom. |
| 1524519 | 9/1978 | United Kingdom. |

*Primary Examiner*—Scott Cummings
*Attorney, Agent, or Firm*—Davis and Bujold

[57] ABSTRACT

Mechanical face seal has a first sealing mounted in fixed axial and rotational relationship and sealed with respect to a housing and a second sealing ring mounted in fixed rotational relationship but movable axially with respect to a shaft. The second sealing ring being sealed with respect to the shaft by means of a bellows unit. One end of the bellows unit being engaged by a first drive band which applies a radial load to the end of the bellows unit forcing it into driving and sealing engagement with the shaft and the other end of the bellows unit being engaged by a second drive band which applies a radial load to the end of the bellows unit forcing it into driving and sealing engagement with the second sealing ring. The inner ends of the drive bands are of equal diameter and have axially extending castellations, the castellations of one drive band intermeshing with the castellations of the other drive band, whereby the drive bands may be telescoped and torsional loads may be reacted between the shaft and the second sealing ring by the ends of the bellows unit and the drive bands. A spring acts between the drive bands to bias them apart and to urge opposed sealing faces of the first and second sealing rings into sealing engagement.

11 Claims, 2 Drawing Sheets

MECHANICAL FACE SEAL WITH ELASTOMERIC BELLOWS UNIT AND INTERMESHING DRIVE BANDS

BACKGROUND OF THE INVENTION

The present invention relates to mechanical face seals in which a first sealing ring is mounted in fixed axial and rotational relationship to a first component and a second sealing ring is mounted in fixed rotational relationship but movable axially with respect to a second component and in particular, to a mechanical face seal of the type described above in which the second sealing ring is sealed with respect to the second component by means of an elastomeric bellows unit.

SUMMARY OF THE INVENTION

According to one aspect of the present invention a mechanical face seal for providing a fluid tight seal between a pair of relatively rotatable components comprises a first sealing ring mounted in fixed axial and rotational relationship and sealed with respect to a first component and a second sealing ring mounted in fixed rotational relationship with respect to a second component, said second sealing ring being sealed with respect to said second component by means of an elastomeric bellows unit, whereby the second sealing ring is movable axially with respect to the second component, characterised in that a pair of tubular drive bands are mounted coaxially of the bellows unit in axially spaced apart relationship to one another, the outer end of one drive band engaging one end of the bellows unit and applying a radial load thereto forcing it into driving and sealing engagement with said second component and the outer end of the other drive band engaging the other end of the bellows unit and applying a radial load thereto forcing it into driving and sealing engagement with the second sealing ring, the inner ends of the drive bands being of equal diameter and having axially extending castellations, the castellations of one drive band intermeshing with the castellations of the other drive band, whereby the drive bands may be telescoped and torsional loads may be reacted between the second component and the second sealing ring by the ends of the bellows unit and the drive bands, resilient means acting between the drive bands to bias them apart and urge opposed sealing faces of the first and second sealing rings into sealing engagement.

According to a preferred embodiment of the invention, the ends of the bellows unit are of relatively thick cross section and are interconnected by a relatively thin, flexible central portion. In its axially relaxed condition, the central portion is generally cylindrical, extending from the end thereof secured to the second component from adjacent the diameter thereof engaging the second component and to the end thereof secured to the second sealing ring adjacent the surface thereof secured to the second sealing ring, so that when compressed axially to its working length, the central portion of the bellows adjacent the second sealing ring will be deformed into engagement with the rear face of the sealing ring and down against the second component, forming a smooth profile with no folds or kinks.

The central portion of the bellows will thereby be supported against the second component in order to withstand fluid pressure on the side of the bellows unit remote from the second component. Furthermore, if pressure is applied between the second component and bellows unit, the telescoped drive bands will support the central portion of the bellows unit, preventing it from ballooning and preserving seal integrity.

BRIEF DESCRIPTION OF THE DRAWINGS

An embodiment of the invention is now described by way of example only, with reference to the accompanying drawings, in which.

DESCRIPTION OF A PREFERRED EMBODIMENT

Figure 1:
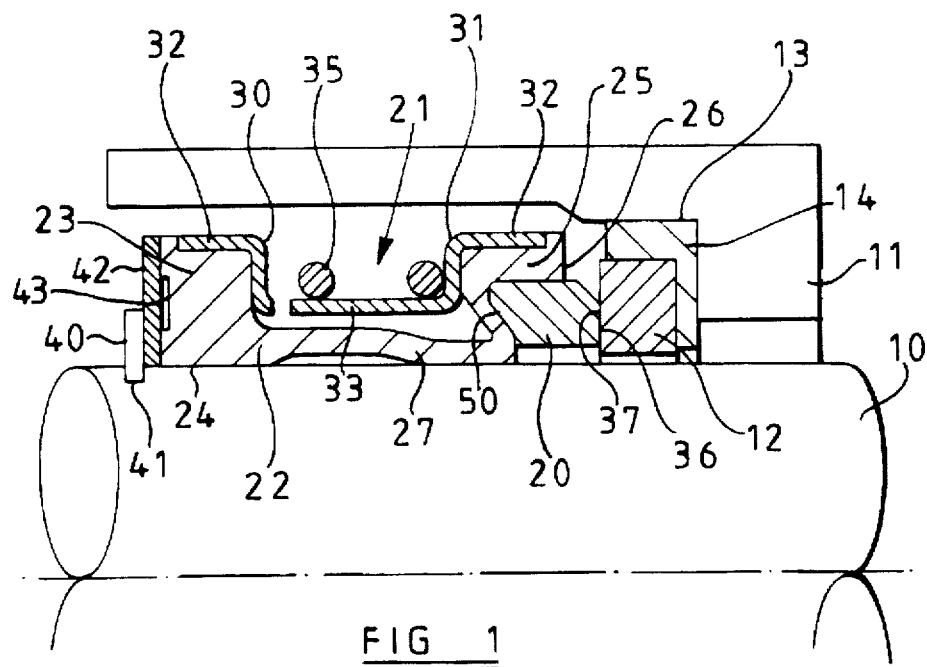
FIG. 1 is a partial sectional side elevation of a mechanical face seal in accordance with the present invention.
Figure 2:
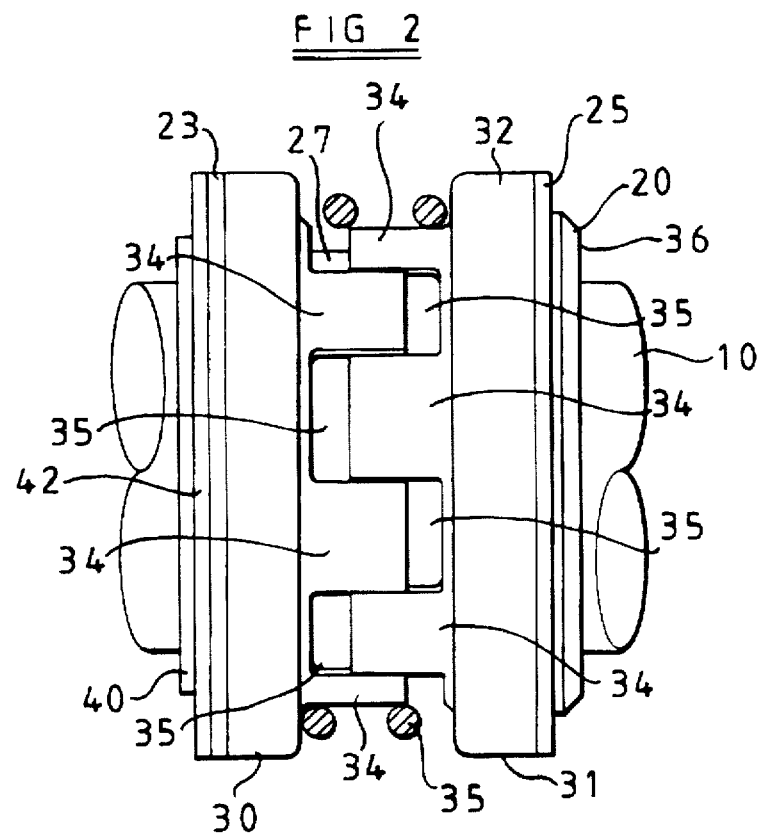
FIG. 2 is a part sectional side elevation of the bellows assembly of the seal illustrated in FIG. 1.
Figure 3:
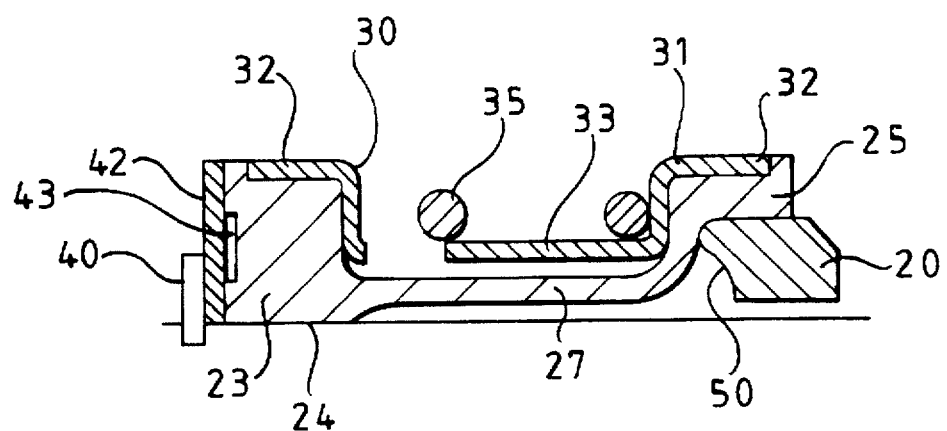
FIG. 3 is a sectional elevation of the bellows unit of the seal illustrated in FIG. 1, in a relaxed condition.
Figure 4:
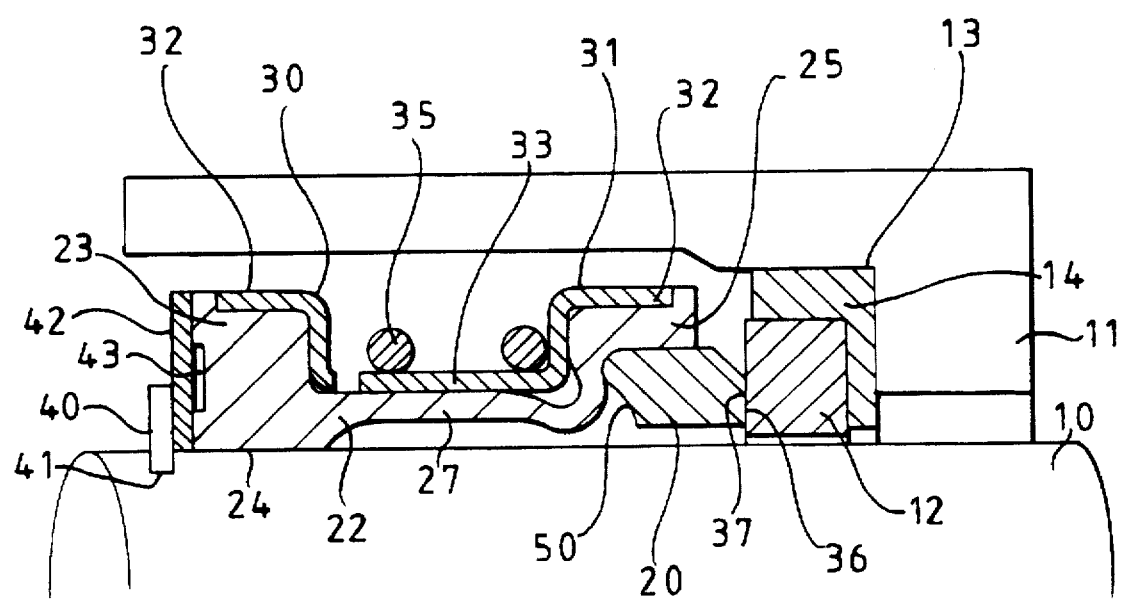
FIG. 4 shows a sectional elevation similar to FIG. 1 in which the bellows unit is internally pressurised.

As illustrated in the accompanying drawings, the mechanical face seal for producing a fluid-tight seal between a shaft 10 and housing 11 comprises, a first sealing ring or seat 12 which is mounted in an annular recess 13 in the housing 11 and is sealed with respect thereto by means of an elastomeric sealing ring 14. The sealing ring 14 also serves to locate the seat 12 rotationally with respect to the housing 11.

A second sealing ring 20 is sealed with respect to the shaft 10 by means of a bellows assembly 21. A bellows assembly 21 includes an elastomeric bellows unit 22 having a first end portion 23, a relatively thin, flexible central portion 27 and a second end portion 25. The first end portion 23 has an internal diameter 24 which will engage the circumference of the shaft 10. The second end portion 25 has an internal diameter 26 which will engage the external diameter of sealing ring 20. The central portion 27 is of generally cylindrical configuration extending from adjacent the internal diameter 24 of end portion 23 and flaring outwardly towards the end portion 25, to connect with the end portion 25 at its internal diameter 26.

A pair of tubular drive bands 30, 31 each comprise a large diameter end portion 32 and a smaller diameter portion 33. The smaller diameter portions 33 of the drive bands 30 and 31 are of equal diameter and are provided with axially extending castellations 34. The castellations 34 on each of the drive bands 30 and 31 are of the same width and the width of the castellations 34 on each drive band 30, 31 are equal to or slightly smaller than the gaps 35 between the castellations 34.

The drive bands 30, 31 are mounted coaxially of the bellows unit 22. The larger diameter portion 32 of drive band 30 engages the external diameter of the end portion 23 of bellows unit 22, squeezing the end portion 23 radially into sealing engagement with the shaft 10 and also locating it rotationally with respect thereto. Similarly, the larger diameter portion 32 of drive band 31 engages the external diameter of the end portion 25 of the bellows unit 22 squeezing the end portion 25 radially into sealing engagement with the external diameter of sealing ring 20 and also locating the sealing ring 20 rotationally with respect to the end portion 25.

The smaller diameter portions 33 of drive bands 30 and 31 are directed towards one another, the castellations 34 of one drive band 30 intermeshing with the castellations 34 of the other drive band 31, in telescoped manner. Torsional loads applied to the sealing ring 20 will thus be transmitted via end portion 25 of bellows unit 22, drive band 31, drive band 30 and the end portion 23 of bellows unit 22, from the shaft 10.

A helical compression spring 35 acts between the larger diameter portions 32 of drive bands 30 and 31, urging them apart and a sealing face 36 on the sealing ring 20 into sealing engagement with a sealing face 37 on the seat 12.

The bellows assembly 21 is located axially with respect to the shaft 10 by means of a circlip 40 which engages in a circumferential groove 41 on the shaft 10, and a thrush washer 42. An annular recess 43 is provided in the end face of end portion 23 of bellows unit 22, to allow for axial expansion of the end portion 23 and contribute to the even radial loading of the bellows onto the shaft, as it is compressed radially between the drive ring 30 and shaft 10.

The rear face 50 of the sealing ring 20 is contoured so that when the bellows assembly 21 is compressed to its working length between the circlip 40 and seat 12, the central portion 27 of the bellows unit 22 will be deformed into engagement with the rear face 50 of sealing ring 20 and down against the shaft 10, forming a smooth profile with no folds or kinks as illustrated in FIG. 1. The flexible central portion 27 of the bellows unit 22 will thereby be supported against the shaft 10, when fluid under pressure is applied to the external diameter of the bellows unit 22. In addition to guiding deformation of the bellow unit 22 the contoured face 50 of sealing ring 20 avoids sharp corners which may tear or cut the bellows unit and also reduces stresses in the bellows unit.

The portion of the bellows unit 22 which is deformed against the rear face 50 of the sealing ring 20 and the telescoped nature of the drive bands 30 and 31 will enable the sealing ring 20 to move axially with respect to the shaft 10, in order to accommodate wear of the sealing faces 36 and 37 of sealing ring 20 and seat 12 respectively.

If fluid pressure is applied to the internal diameter of the bellows unit 22, then the telescoped smaller diameter portions 33 of drive bands 30 and 31 will support the central portion 27 of the bellows unit 22, preventing it from ballooning outwardly and preserving the integrity of the seal.

The sealing rings 12 and 20 of the present invention may be made of any of the conventional combinations of materials normally used in mechanical face seals, for example carbon/graphite against a metal, ceramic or ceramic coated material or metal against ceramic or ceramic against ceramic. Any suitable elastomeric composition may be used for the bellows unit. The drive bands are preferably made of stainless steel although other metals or rigid plastics materials could be used.

Various modifications may be made without departing from the invention. For example the seat 12 may be sealed with respect to the housing 11 in any other conventional manner, for example the use of an 'O'ring or PTFE ring. Furthermore, rather than relying on friction to locate the seat 12 rotationally with respect to the housing 11, one or more pins may be provided which engage the seat 12 and housing 11 to prevent rotation therebetween.

While in the above embodiment the bellows assembly 21 is located axially of the shaft 10 by circlip 41, other conventional methods of locating the bellows assembly 21 may be used. For example the bellows assembly 21 may abut a shoulder formation on the shaft or a collar or sleeve formation secured to the shaft in suitable manner.

While in the above embodiment the bellows assembly 21 is mounted on the shaft 10 and the seat 12 is mounted to the housing 11, the bellows assembly 21 may alternatively be mounted with respect to the housing 11 and the seat 12 mounted with respect to the shaft.

I claim:

1. A mechanical face seal for providing a fluid-tight seal between a pair of relatively rotatable components comprising a first sealing ring mounted in fixed axial and rotational relationship and sealed with respect to a first component and a second sealing ring mounted in fixed rotational relationship with respect to a second component, said second sealing ring being sealed with respect to said second component by means of an elastomeric bellows unit, whereby the second sealing ring is movable axially with respect to the second component, a pair of tubular drive bands being mounted coaxially of the bellows unit in axially spaced apart relationship to one another, the outer end of one drive band engaging one end of the bellows unit and applying a radial load thereto forcing it into driving and sealing engagement with said second component and the outer end of the other drive band engaging the other end of the bellows unit and applying a radial load thereto forcing it into driving and sealing engagement with the second sealing ring, the inner ends of the drive bands being of equal diameter and having axially extending castellations, the castellations of one drive band intermeshing with the castellations of the other drive band, whereby the drive bands may be telescoped and torsional loads may be reacted between the second component and the second sealing ring by the ends of the bellows unit and the drive bands, resilient means acting between the drive bands to bias them apart and urge opposed sealing faces of the first and second sealing rings into sealing engagement.

2. A mechanical face seal according to claim 1 in which the bellows unit comprises a pair of end portions interconnected by a relatively thin, flexible central portion.

3. A mechanical face seal according to claim 2 in which when the bellows unit is compressed to its working length, the central portion of the bellows unit is deformed against the rear face of the second sealing ring and into engagement with the second component, to form a smooth profile without folds or kinks.

4. A mechanical face seal according to claim 1 in which the rear face of the second sealing ring is profiled.

5. A mechanical face seal according to claim 1, in which the first component is a housing and the second component a shaft.

6. A mechanical face seal according to claim 5 in which the bellows unit comprises a first end portion the internal diameter of which engages the shaft, a second end portion the internal diameter of which engages the external diameter of the second sealing ring and a relatively thin flexible central portion, the central portion being of generally cylindrical configuration extending from the first end portion adjacent the internal diameter thereof, the end of the central portion adjacent the second end portion being flared outwardly and being connected to the second end portion on the internal diameter thereof.

7. A mechanical face seal according to claim 6 in which the outer ends of the drive bands are of enlarged diameter which engage the external diameters of the first and second end portions of the bellows unit.

8. A mechanical face seal according to claim 7 in which a helical compression spring acts between the enlarged diameter end portions of the drive bands biasing them apart.

9. A mechanical face seal according to claims 6 in which the bellows unit is located axially on the shaft by means of a circlip which engages in a circumferential groove on the shaft and a thrust washer, a shoulder formation on the shaft, or a collar or sleeve member secured to the shaft.

10. A mechanical face seal according to claim 6 in which when fluid under pressure is applied to the internal diameter of the bellows unit, the central portion of the bellows unit engages the internal diameter of the telescoped drive bands.

11. A mechanical face seal according to claim 1 in which an annular recess is provided in the end face of the end of the bellows unit which engages the second component, the annular recess providing relief for axial expansion of that end of the bellows unit as it is compressed radially into engagement with the second component.

* * * * *